(12) United States Patent
Parker et al.

(10) Patent No.: US 8,333,949 B2
(45) Date of Patent: Dec. 18, 2012

(54) METHOD FOR CREATING HIGH CARBON CONTENT PRODUCTS FROM BIOMASS OIL

(75) Inventors: Reginald Parker, Durham, NC (US); Wayne Seames, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 20 days.

(21) Appl. No.: 12/800,449

(22) Filed: May 14, 2010

(65) Prior Publication Data

US 2010/0296997 A1    Nov. 25, 2010

Related U.S. Application Data

(60) Provisional application No. 61/216,177, filed on May 14, 2009.

(51) Int. Cl.
*C01D 3/00* (2006.01)

(52) U.S. Cl. .............. 423/449.9; 423/445 R; 423/418.2; 585/240; 585/310

(58) Field of Classification Search .............. 423/445 R, 423/449.9; 208/39; 585/240, 310
See application file for complete search history.

(56) References Cited

U.S. PATENT DOCUMENTS

| | | | | |
|---|---|---|---|---|
| 3,412,009 | A | * | 11/1968 | Smith et al. ..................... 208/72 |
| 4,026,788 | A | * | 5/1977 | McHenry ....................... 208/39 |
| 4,364,745 | A | | 12/1982 | Weil |
| 4,992,605 | A | | 2/1991 | Craig et al. |
| 5,233,109 | A | | 8/1993 | Chow |
| 5,520,708 | A | | 5/1996 | Johnson et al. |
| 5,578,090 | A | | 11/1996 | Bradin |
| 5,705,722 | A | | 1/1998 | Monnier et al. |
| 5,986,133 | A | | 11/1999 | Holtzapple et al. |
| 6,284,008 | B1 | | 9/2001 | Caprotti |
| 6,709,848 | B1 | * | 3/2004 | Martin et al. ................. 435/134 |
| 6,897,338 | B2 | * | 5/2005 | Zhong et al. .................. 562/599 |
| 7,014,668 | B2 | | 3/2006 | Golubkov et al. |
| 7,041,738 | B2 | | 5/2006 | Krull et al. |

(Continued)

FOREIGN PATENT DOCUMENTS

WO    WO2008039756 A2    4/2008

(Continued)

OTHER PUBLICATIONS

S.M. Sadrameli, A Green, W. Seames. "Modeling Representations of Canola Oil Catalytic Cracking for the Production of Renewable Aromatic Hydrocarbons". J. Nala. Appl. Pyrolysis 86 (2009) 1-7. Available online Mar. 10, 2008.*

(Continued)

*Primary Examiner* — Stuart Hendrickson
*Assistant Examiner* — Richard M Rump
(74) *Attorney, Agent, or Firm* — Kinney & Lange, P.A.

(57) ABSTRACT

In a method for producing high carbon content products from biomass, a biomass oil is added to a cracking reactor vessel. The biomass oil is heated to a temperature ranging from about 100° C. to about 800° C. at a pressure ranging from about vacuum conditions to about 20,700 kPa for a time sufficient to crack the biomass oil. Tar is separated from the cracked biomass oil. The tar is heated to a temperature ranging from about 200° C. to about 1500° C. at a pressure ranging from about vacuum conditions to about 20,700 kPa for a time sufficient to reduce the tar to a high carbon content product containing at least about 50% carbon by weight.

20 Claims, 2 Drawing Sheets

U.S. PATENT DOCUMENTS

| | | | |
|---|---|---|---|
| 7,045,100 | B2 | 5/2006 | Ergun et al. |
| 2003/0093942 | A1 | 5/2003 | Jordan |
| 2003/0167681 | A1 | 9/2003 | Delgado Puche |
| 2004/0074760 | A1 | 4/2004 | Portnoff et al. |
| 2004/0231236 | A1 | 11/2004 | May et al. |
| 2005/0232956 | A1 | 10/2005 | Bist et al. |
| 2006/0024801 | A1 | 2/2006 | Holtzapple et al. |
| 2006/0236598 | A1 | 10/2006 | Selvidge |
| 2007/0014895 | A1 | 1/2007 | Holtzapple et al. |
| 2007/0039240 | A1 | 2/2007 | Carroway |
| 2007/0068848 | A1 | 3/2007 | Monnier et al. |
| 2007/0137097 | A1 | 6/2007 | Ikura |
| 2007/0144060 | A1 | 6/2007 | Ikura |
| 2007/0161832 | A1* | 7/2007 | Myllyoja et al. .......... 585/7 |
| 2007/0170091 | A1 | 7/2007 | Monnier et al. |
| 2008/0185112 | A1* | 8/2008 | Argyropoulos .......... 162/9 |
| 2008/0244976 | A1* | 10/2008 | Paisley .......... 48/62 R |

FOREIGN PATENT DOCUMENTS

WO    WO2008103204 A2    8/2008

OTHER PUBLICATIONS

R. O. Dunn, et al., "Low-Temperature Properties of Triglyceride-Based Diesel Fuels: Transesterified Methyl Esters and Petroleum Middle Distillate/Ester Blends", from JAOCS, vol. 72, No. 8, pp. 895-904 (1995).

I. Lee, et al., "Use of Branched-Chain Esters to Reduce the Crystallization Temperature of Biodiesel", from JAOCS, vol. 72, No. 10, pp. 1155-1160 (1995).

S. P. R. Katikaneni, et al., "Catalytic Conversion of Canola Oil to Fuels and Chemicals Over Various Cracking Catalysts", from The Canadian Journal of Chemical Engineering, vol. 73, pp. 484-497 (1995).

M. S. Graboski, et al., "Combustion of Fat and Vegetable Oil Derived Fuels in Diesel Engines," from Prog. Energy Combust. Sci., vol. 24, pp. 125-164 (1998).

F. Ma, et al., "Biodiesel Production: A Review", from Bioresource Technology 70, pp. 1-15 (1999).

R. O. Dunn, "Alternative Jet Fuels From Vegetable Oils", from American Society of Agricultural Engineers, vol. 44, pp. 1751-1757 (2001).

Y. S. Ooi, et al., "Catalytic Conversion of Palm Oil-Based Fatty Acid Mixture to Liquid Fuel", from Biomass and Bioenergy 27, pp. 477-484 (2004).

E. Corporan, et al., "Impacts of Biodiesel on Pollutant Emissions of a JP-8-Fueled Turbine Engine", from Journal of the Air & Waste Management Assoc., vol. 55, pp. 940-949 (Jul. 2005).

S. M. Sadrameli, et al., "Systematics of Renewable Olefins From Thermal Cracking of Canola Oil," from J. Anal. Appl. Pyrolysis 78, pp. 445-451 (2007).

B. K. Bhaskara Rao, "Modern Petroleum Refining Processes", Oxford & IBH Publishing Co. Pvt. Ltd. (5th Ed. 2007) pp. 304-407.

"The Need for Leaded Avgas." EPI Inc. First published Feb. 28, 2008. Retrieved Apr. 28, 2010 from <http://www.epi-eng.com/aircraft_engine_products/demise_of_avgas.htm>.

* cited by examiner

METHOD FOR CREATING HIGH CARBON CONTENT PRODUCTS FROM BIOMASS OIL

CROSS-REFERENCE TO RELATED APPLICATION(S)

This application claims priority to U.S. Provisional Application No. 61/216,177, filed May 14, 2009, the disclosure of which is incorporated by reference in its entirety.

STATEMENT OF GOVERNMENT INTEREST

This invention was made with government support under Grant No. DE-FG02-06ER46292 awarded by the United States Department of Energy. The government may have certain rights in the invention.

BACKGROUND

One drawback limiting the commercialization of cracking processes to convert biomass and plant oils into fuels and chemicals is the generation of high molecular weight polymeric organic compounds, commonly known as "tars" or "coke." These materials reduce the overall conversion efficiency of the cracking process, generate unwanted by-products, and lead to catalyst fouling and other deactivation processes.

Following the invention of carbon nanotubes and other carbon-based products made from high purity carbon, high purity carbon is becoming an increasingly important commodity. High purity carbon is currently most commonly produced from graphitized petroleum coke, calcined petroleum coke, calcined anthracite, coal tar pitch, wood, and some biomass (primarily lignin, hemi-cellulose, and/or cellulosic organic material). Of these existing processes, only biomass carbonization allows the production of high purity carbon from a renewable source.

Due to recent concerns about global warming, processes that utilize fossil-based carbon, such as crude oil and coal, as a raw material should be reduced. The discovery and commercialization of new, renewable source alternatives offers the potential for making high purity carbon without contributing to global warming. Furthermore, it is desirable to find alternatives that have comparable or superior properties to fossil-based carbon, can be produced in a cost competitive manner, and require low processing energy.

SUMMARY

In a method for producing high carbon content products from biomass, a biomass oil is added to a cracking reactor vessel. The biomass oil is heated to a temperature ranging from about 100° C. to about 800° C. at a pressure ranging from about vacuum conditions to about 20,700 kPa for a time sufficient to crack the biomass oil. Tar is separated from the cracked biomass oil and heated to a temperature ranging from about 200° C. to about 1500° C. at a pressure ranging from about vacuum conditions to about 20,700 kPa for a time sufficient to reduce the tar to a high carbon content product containing at least about 50% carbon by weight.

DETAILED DESCRIPTION

The present invention utilizes cracking and carbonization reactions coupled with separation techniques to develop biomass-based high carbon content products that can replace commercially available products generated from non-renewable sources and other renewable sources.

The present invention provides for the production and purification of high carbon content products from biomass oil. High carbon content products include products that are predominantly composed of elemental carbon or carbon derivatives. High carbon content products typically include compounds containing 50% or greater carbon by weight, as measured by elemental carbon analysis. Biomass includes any organic, non-fossil material that is derived from the mass of any biological organism excluding mass that has been transformed by geological processes in substances such as coal or petroleum. Biomass oils include any oil derived from a biomass source. Biomass oils include, but are not limited to, plant oils, biologically generated lipids, and animal fats. Plant oils include lipids derived from plant sources. Plant sources include any living organism that is a member of the kingdom Plantae or of the division Chlorphyta (green algae). Examples of plant oils include crop oils, oilseeds and vegetable oils. Particularly suitable biomass oils for producing high carbon content products include triacylglycerides, long chain fatty acids, long chain lipids, and similar chemical compounds.

The present invention provides a means to produce valuable and necessary elemental carbon and carbon derivatives from biomass and plant oil feed stocks. The chemical modifications, based on the use of cracking reactions, carbonization reactions, and separation techniques, are designed to produce commercial quality high carbon content products that can directly replace comparable carbon products generated from fossil fuel and other sources. Cracking reactions include any processes that change the chemical composition of an organic chemical or chemical mixture by cleaving one or more carbon-carbon bonds in one or more molecules. Carbonization reactions include processes that convert organic substance into elemental carbon or carbon-containing residues through pyrolysis or destructive distillation.

Processes to produce fuels and short chain carboxylic acids from plant oils and biomass oils using cracking have been previously described in U.S. patent application Ser. Nos. 11/824,664 and 12/319,028, which are incorporated by reference. The present invention further improves upon these processes to produce high carbon content products in addition to resolving problems related to catalyst fouling and other catalyst deactivation processes during biomass and plant oil cracking. During cracking, it is possible to separate and recover tars formed during the cracking process and produce high carbon products from these tars.

Figure 1:
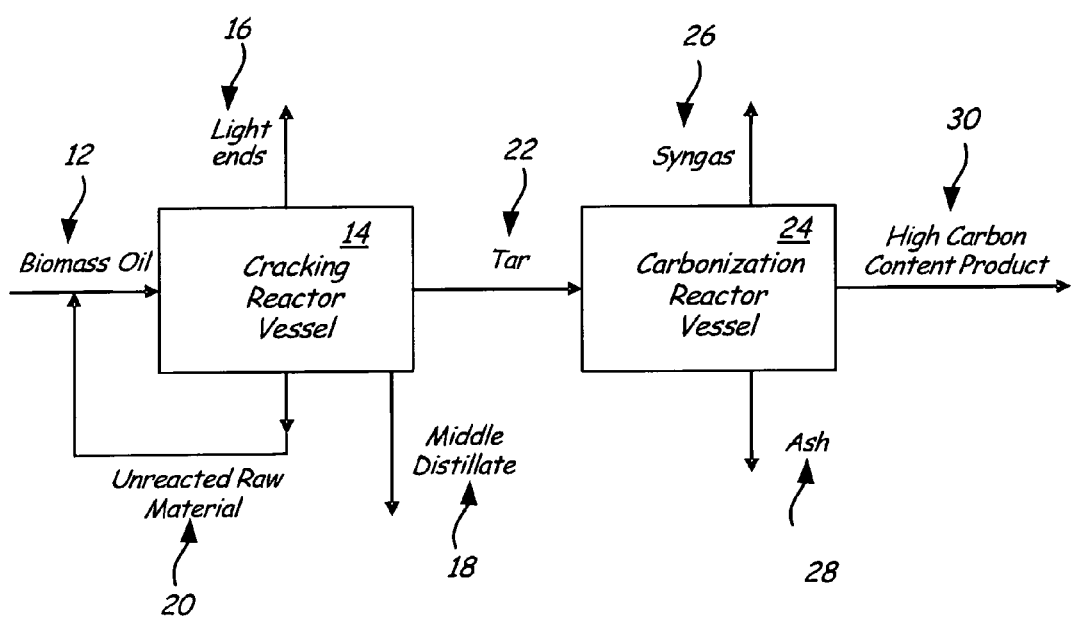
FIG. 1 is a flow diagram illustrating a method for producing high carbon content products from biomass oil.

FIG. 1 is a simplified flow diagram of method 10 that generates a high carbon content product. Biomass oil 12 is added to cracking reactor vessel 14. Biomass oil 12 can be a crop oil, lipid or animal fat feedstock, triacylglyceride, long chain fatty acid, long chain lipid, a similar chemical compound or a combination of any of the above. Biomass oil 12 can be produced by processes now available or those that may be developed in the future. Examples of biomass oil 12 include triacylglycerides, representing a group of chemical compounds that can be found in plant oils or medium (C10-C14) and long (greater than C16) chain fatty acids, and are naturally synthesized and found in biomass such as algae, animal fats, or modified materials. Triacylglycerides in plant oils consist of three medium (C10-C14) and/or long (greater than C16) chain fatty (naturally synthesized carboxylic) acids connected via a glycerol group. Plant oils include, but are not limited to, flax, soybean, safflower, sunflower, sesame, canola, rapeseed, jatropha, primrose, poppy, camelina, crambe, olive, coconut, palm, cotton, corn, soybean, and nut oils. Typical fatty acids contained in crop oils include both saturated and unsaturated fatty acids. Saturated fatty acids do not contain any double bonds or other functional groups. Unsaturated fatty acids contain two or more carbon atoms having a carbon-carbon double bond. Saturated acids include stearic (C18; 18:0), palmitic (C16; 16:0), myristic (C14; 14:0), and lauric (C12; 12:0). Unsaturated acids include those such as linolenic (cis, cis, cis C18; 18:3), linoleic (cis, cis C18; 18:2), oleic (cis C18; 18:1), hexadecanoic (cis, cis C16; 16:2), palmitoleic (cis C16; 16:1), and myristoleic (cis C14; 14:1).

Biomass oil 12 can be preheated or fed directly into cracking reactor vessel 14. Biomass oil 12 is cracked within cracking reactor vessel 14. By varying the time, temperature, and pressure under which biomass oil 12 remains in cracking reactor vessel 14 under cracking conditions, the desired degree of cracking (conversion) can be controlled. Temperature and time (residence time) are the more important process variables with pressure playing a secondary role. Suitable cracking temperatures range from about 100° C. to about 800° C., with particularly suitable cracking temperatures ranging from about 300° C. to about 700° C. Suitable residence times include up to about 500 minutes, with particularly suitable residence times being about 180 minutes or less. Suitable cracking pressures range from about vacuum conditions to about 20,700 kPa (3000 psia).

Products of the cracking process depend upon the cracking conditions, the original composition of biomass oil 12, the gaseous environment present in cracking reactor vessel 14, and the configuration of cracking reactor vessel 14. Cracking conditions (temperature, residence time, pressure) are varied based on a detailed chemical analysis of biomass oil 12 in order to produce an optimal mixture of chemical components (e.g., middle distillates, short chain fatty acids, etc.) during the cracking process. The gaseous environment inside cracking reactor vessel 14 can vary depending on the composition of biomass oil 12 and the cracking conditions. Inert gases, nitrogen, water vapor, hydrogen, a mixture of vapor-phase organic chemicals and combinations thereof can be introduced to cracking reactor vessel 14 before or during cracking. Cracking reactor vessel 14 can have various reactor configurations. These configurations include batch, continuous flow through, flow through packed bed, and fluidized bed.

In the cracking process, energy is used to break carbon-carbon bonds. Cracking can be thermal or catalytic. In thermal cracking, thermal energy is added to a substance to cleave carbon-carbon bonds. In catalytic cracking, a catalyst is used to promote bond cleavage. For example, in thermal cracking, each carbon atom split from a carbon-carbon bond ends up with a single electron and forms a radical. Reactions of the radicals can lead to various products. Breaking large organic molecules into smaller and more useful molecules can be achieved at either low or high pressure and at moderately high temperatures with a catalyst (catalytic cracking) or without (thermal cracking). Medium (C10-C14) and long (greater than C16) chain fatty (naturally synthesized carboxylic) acids are compatible with cracking processes, using either thermal or catalytic cracking. Suitable catalysts for catalytic cracking include, but are not limited to, alumina, silica-alumina, sulfated metal oxides, zeolites, palladium, niobium, molybdenum, platinum, titanium, aluminum, cobalt, gold and combinations thereof.

The cracking output from cracking reactor vessel 14 can be subjected to a variety of processing steps depending on the material generated. Material generated in the cracking reactor can be classified in one of four general classes: light ends 16, middle distillate 18, unreacted raw material (recyclables) 20, and tar 22. Each of these materials can be separated within cracking reactor vessel 14 or during a later separation. Separation processes can include cooling or heating, liquid/solid separation, vapor/liquid separation, vapor/solid separation, chemical reactions, or other chemical/physical property manipulation.

Light ends 16 are compounds which stay in the gaseous phase at temperatures and pressures where middle distillates are in the liquid phase. Light ends 16 include any unreacted vapor-phase material added to the reactor to manipulate the cracking reaction, such as hydrogen, nitrogen, or water vapor, in addition to small molecular weight organic chemicals and hydrocarbons generated in cracking reactor vessel 14 during cracking. The small molecular weight organic chemicals and hydrocarbons include methane, methanol, ethane, ethanol, n-pentane, i-pentane, pentene, pentanol, n-butane, i-butane, butanol, butane, methyl ester, ethyl ester, etc. Light ends 16 are separated from other material that exits cracking reactor vessel 14 by gas-liquid phase separation, distillation, condensation, or other separation processes.

Middle distillate 18 contains chemicals that have properties suitable for inclusion in gasoline, kerosene, or diesel type fuels or that have volatilities similar to those paraffins and/or olefins that are suitable for inclusion in gasoline, kerosene, or diesel type fuels. Middle distillate 18 includes a mixture of aromatic compounds, cycloparaffinic compounds, short chain carboxylic acid compounds, linear paraffinic compounds, olefins, and other minor components generated in cracking reactor vessel 14. Components of middle distillate 18 have properties desirable in transportation fuels and/or organic-based chemicals. Transportation fuels include kerosene, jet fuel, gasoline blendstock, and multiple grades of diesel fuel. Organic-based chemicals include aromatics such as benzene and toluene and short chain fatty acids such as acetic and propionic acid and their derivatives. Short chain fatty acids can be removed from middle distillate 18 according to U.S. patent application Ser. No. 12/319,028.

In one embodiment, middle distillate 18 is produced by collecting fractions of cracked biomass having at least one of C4 to C16 alkanes, alkenes, aromatics, cycloparaffins, or alcohols; C2 to C16 fatty acids; or C2 to C16 fatty acid methyl esters. Collected fractions are combined to produce a fuel composition having a cloud point less than −10° C. A mixture of C2 to C16 short chain carboxylic acids is also collected.

Unreacted raw material 20 includes those compounds having a chemical composition unsuitable as a component of middle distillate 18 and that can be exposed to additional cracking. These compounds may be chemically identical to the original raw material (biomass oil 12), a fatty acid whose length is identical or similar to fatty acid chains in biomass oil 12, or a partially cracked paraffin, olefin, or carboxylic acid that has too many carbon atoms in its primary carbon chain to be suitable as a middle distillate component. Unreacted raw material 20 can include chemicals that enter the cracking reactor but are not converted to chemical compounds with carbon chains shorter than C16. These materials have some chemical and physical properties that are undesirable in final products. Unreacted raw material 20 is separated from middle distillate 18 and tar 22 by distillation or other separation techniques. Unreacted raw material 20 can be returned to cracking reactor vessel 14, transferred to a second cracking reactor vessel for different cracking conditions, or utilized for some other purpose.

Tar 22 includes long chain chemical compounds generated during the cracking reaction. Tar 22 includes chemicals produced during cracking reactions that have a higher molecular weight and/or lower volatility and/or lower heating value than is desired in middle distillate 18. Some of the components of tar 22 can be separated from middle distillate 18 along with unreacted raw material 20 and processed with unreacted raw material 20. Tar 22 can be separated from middle distillate 18 by solvent extraction, distillation, reactive distillation, evaporation, membrane separation, chemical reaction and combinations thereof. Other tar 22 components, typically those of higher molecular weight, will be solids following cracking.

Tar 22 that is not reprocessed with unreacted raw material 20 can be transferred to a carbonization reactor vessel 24 where it is exposed to carbonization conditions to produce high carbon content products. By varying the time, temperature, and pressure under which tar 22 remains under carbonization conditions, the desired degree of carbonization can be controlled. Suitable carbonization temperatures range from about 200° C. to about 1500° C., with particularly suitable carbonization temperatures ranging from about 400° C. to about 800° C. Suitable residence times include up to about 500 minutes. Suitable carbonization pressures range from about vacuum conditions to about 20,700 kPa (3000 psia). Tar 22 is heated under carbonization conditions to maximize the production of a high carbon content product.

During carbonization, pyrolyzation reactions take place and carbonization reactor vessel 24 produces syngas 26, ash 28 and high carbon content product 30 from tar 22. Syngas 26 is a gas mixture that contains varying amounts of carbon monoxide, hydrogen, carbon dioxide and methane. Syngas 26 is combustible and often used as a fuel source or as an intermediate for the production of other chemicals. Ash 28 is a solid, non-combustible remnant of tar 22 and biomass oil 12. Syngas 26 and ash 28 can be separated from high carbon content product 30 within carbonization reactor vessel 24 or during a later separation. At carbonization conditions, syngas 26 is a gas, ash 28 is a solid and high carbon content product 30 is generally a liquid.

High carbon content product 30 includes elemental carbon and carbon-containing residues. Suitable high carbon content product 30 contains at least about 50% carbon by weight. More preferably, high carbon content product 30 contains at least about 70% carbon by weight. Most preferably, high carbon content product 30 contains at least about 90% carbon by weight. The carbonization conditions within carbonization reactor vessel 24 and the selection of biomass oil 12 determine the carbon levels of high carbon content product 30.

Inert gases, nitrogen, water vapor, hydrogen, a mixture of vapor-phase organic chemicals and combinations thereof can be introduced to carbonization reactor vessel 24 before or during carbonization. Additional chemicals can also be added to carbonization reactor vessel 24 in order to improve the properties of high carbon content product 30. For example, chlorine or chlorinated compounds can be introduced into carbonization reactor vessel 24 to form chlorinated carbon groups. Chlorinated carbon can be used in various mercury capture applications. Hydrochloric acid or phosphoric acid can also be added to carbonization reactor vessel 24 to facilitate the removal of functional groups from the carbon chain backbones of tar 22 and/or high carbon content product 30.

High carbon content products 30 can be further processed to yield specific desired carbon products. For example, high carbon content products 30 can be physically processed into a granulated carbon product. Elemental carbon can be subjected to additional chemical reactions to produce other carbon based products. High carbon content products 30 include but are not limited to high-purity granulated carbon, activated carbon, and carbon black.

EXAMPLE

Soybean oil was heated to a temperature between 300° C. and 500° C. in a cracking reactor vessel at a pressure between about vacuum conditions and 20,700 kPa (3000 psia) for less than 180 minutes to induce cracking reactions that changed the chemical composition of the original soybean oil. The liquid and solids leaving the cracking reactor vessel were subjected to downstream processing in order to separate the various materials. Unreacted raw material and partially reacted material separated from the middle distillates and the tars was recycled to the cracking reactor or transferred to additional cracking reactors.

Tars were collected directly from the bottom of the cracking reactor vessel and cooled to room temperature. The tars were placed in a vacuum oven (carbonization reactor vessel) at temperatures ranging from 480° C. to 600° C. at a pressure of 101 kPa (14.7 psia) for either five or ten minutes. Syngas created during carbonization was continuously removed from the vacuum oven. Insignificant amounts of ash were generated under these carbonization conditions. The resulting solid materials were analyzed for carbon content.

Figure 2:
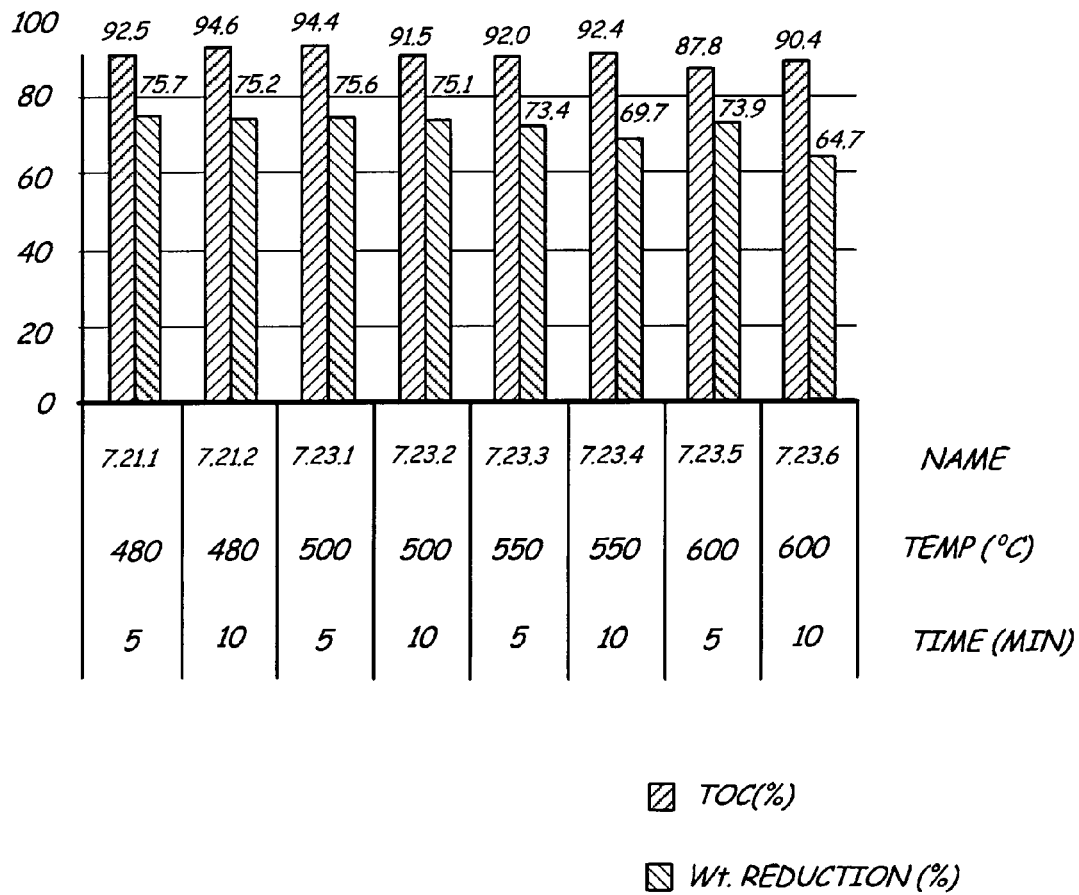
FIG. 2 is a chart illustrating total organic carbon content of high carbon content products produced according to the present invention.

FIG. 2 illustrates the total organic carbon content (TOC) and the weight reduction from tar to high carbon content product for the various conditions tested. In the graph illustrated in FIG. 2, each group of bars represents TOC and weight reduction for a condition with a particular carbonization time and temperature. TOC is represented by the bars on the left and weight reduction is represented by the bars on the right. As shown, when carbonization reactions were performed at 480° C. for ten minutes, 24.8% of the initial tar material was removed, leaving a high carbon content product containing 94.6% total organic carbon.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for producing high carbon content products from biomass, the method comprising:
   adding a biomass oil to a cracking reactor vessel;
   cracking the biomass oil in the cracking reactor vessel at a temperature ranging from 100° C. to 800° C. at a pressure ranging from vacuum conditions to 20,700 kPa (3000 psia) for a time sufficient to crack the biomass oil;
   separating tar from cracked biomass oil; and
   heating the tar to a temperature ranging from 200° C. to 1500° C. at a pressure ranging from vacuum conditions to 20,700 kPa (3000 psia) for a time sufficient to reduce the tar to a high carbon content product containing at least 50% carbon by weight.

2. The method of claim 1, wherein the high carbon content product contains at least 70% carbon by weight.

3. The method of claim 1, wherein the high carbon content product contains at least 90% carbon by weight.

4. The method of claim 1, wherein the step of separating tar from cracked biomass oil is selected from the group consisting of solvent extraction, distillation, reactive distillation, evaporation, membrane separation, chemical reaction and combinations thereof.

5. The method of claim 1, wherein the biomass oil is selected from the group consisting of plant oil, microbial lipid, animal fat, triacylglycerides, long chain fatty acids, long chain lipids and combinations thereof.

6. The method of claim 5, wherein the biomass oil is a plant oil selected from the group consisting of soybean oil, canola oil, palm oil, sunflower oil, corn oil, flaxseed oil, jatropha oil, cottonseed oil, safflower oil, crambe oil, evening primrose oil, sesame oil, rapeseed oil, olive oil, coconut oil, camelina oil, jojoba oil, and combinations thereof.

7. The method of claim 1, wherein the biomass oil is heated in the cracking reactor vessel to a temperature ranging from 300° C. to 700° C.

8. The method of claim 1, wherein the biomass oil is heated in the cracking reactor vessel for up to 500 minutes.

9. The method of claim 1, wherein the biomass oil is heated in the cracking reactor vessel with a gas selected from the group consisting of an inert gas, nitrogen, water vapor, hydrogen, a mixture of vapor-phase organic chemicals and combinations thereof.

10. The method of claim 1, wherein a catalyst selected from the group consisting of alumina, silica-alumina, sulfated metal oxides, zeolites, palladium, niobium, molybdenum, platinum, titanium, aluminum, cobalt, gold and combinations thereof is added to the cracking reactor vessel.

11. The method of claim 1, wherein the tar is heated to a temperature ranging from 400° C. to 800° C.

12. The method of claim 1, wherein the tar is heated for up to 500 minutes.

13. The method of claim 1, wherein the tar is heated with a gas selected from the group consisting of an inert gas, nitrogen, water vapor, hydrogen, a mixture of vapor-phase organic chemicals and combinations thereof.

14. The method of claim 1, further comprising:
processing the high carbon content product into activated carbon or carbon black.

15. A method for producing a high carbon content product, short chain carboxylic acids and a fuel composition having a low cloud point from biomass, the method comprising:
cracking a biomass oil in a reactor vessel at a temperature ranging from 100° C. to 800° C. and a pressure ranging from vacuum conditions to 20,700 kPa (3000 psia) for a time sufficient to crack the biomass oil;
collecting fractions of cracked biomass oil including at least one of C4 to C16 alkanes, alkenes, aromatics, cycloparaffins, or alcohols; C2 to C16 fatty acids; or C2 to C16 fatty acid methyl esters and combining collected fractions of cracked biomass oil to produce a fuel composition having a cloud point less than −10° C.;
collecting a mixture from the cracked biomass oil containing C2 to C16 carboxylic acids; and
separating tar from the cracked biomass oil and heating the tar to a temperature ranging from 200° C. to 1500° C. at a pressure ranging from vacuum conditions to 20,700 kPa (3000 psia) for a time sufficient to reduce the tar to a high carbon content product containing at least 50% carbon by weight.

16. The method of claim 15, wherein the biomass oil is selected from the group consisting of plant oil, microbial lipid, animal fat, triacylglycerides, long chain fatty acids, long chain lipids and combinations thereof.

17. The method of claim 15, wherein the high carbon content product contains at least 70% carbon by weight.

18. The method of claim 1, wherein the biomass oil is heated in the cracking reactor vessel in the absence of a catalyst.

19. The method of claim 15, wherein the biomass oil is heated in the reactor vessel in the absence of a catalyst.

20. The method of claim 1, wherein the high carbon content product containing at least 50% carbon by weight is free of catalysts.

* * * * *